US012162433B2

United States Patent
Sugita et al.

(10) Patent No.: US 12,162,433 B2
(45) Date of Patent: Dec. 10, 2024

(54) VEHICLE, VEHICLE CONTROL METHOD, AND NON-TRANSITORY RECORDING MEDIUM

(71) Applicant: TOYOTA JIDOSHA KABUSHIKI KAISHA, Toyota (JP)

(72) Inventors: Yoshiya Sugita, Toyota (JP); Akihiro Muramatsu, Toyota (JP); Satoshi Ozawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/056,759

(22) Filed: Nov. 18, 2022

(65) Prior Publication Data

US 2023/0219524 A1 Jul. 13, 2023

(30) Foreign Application Priority Data

Jan. 13, 2022 (JP) .................................. 2022-003863

(51) Int. Cl.
*B60R 25/24* (2013.01)
*B60R 25/31* (2013.01)
(52) U.S. Cl.
CPC ............ *B60R 25/245* (2013.01); *B60R 25/31* (2013.01)

(58) Field of Classification Search
CPC .............................. B60R 25/245; B60R 25/31
See application file for complete search history.

(56) References Cited

U.S. PATENT DOCUMENTS

| 7,205,884 | B2* | 4/2007 | Kumazaki | G07C 9/00309 340/5.61 |
| 8,717,142 | B2* | 5/2014 | Nagao | G07C 9/00309 340/426.36 |
| 11,280,119 | B2* | 3/2022 | Usui | E05B 81/64 |
| 2006/0238296 | A1* | 10/2006 | Konno | B60R 25/02 340/5.61 |
| 2009/0079225 | A1* | 3/2009 | Katou | E05B 77/48 701/49 |
| 2012/0083148 | A1* | 4/2012 | Hirashita | H01R 13/639 439/304 |
| 2015/0061830 | A1* | 3/2015 | Yamane | G07C 9/00182 340/5.64 |
| 2017/0050618 | A1* | 2/2017 | Lickfelt | B60R 25/403 |

FOREIGN PATENT DOCUMENTS

| JP | 2012-082654 A | 4/2012 |
| JP | 2018-52188 A | 4/2018 |
| JP | 2018-096118 A | 6/2018 |

* cited by examiner

*Primary Examiner* — Thomas D Alunkal
(74) *Attorney, Agent, or Firm* — Oblon, McClelland, Maier & Neustadt, L.L.P.

(57) ABSTRACT

Switching signals are transmitted that cause a reception sensitivity to wireless signals of an electronic key to be lowered.

3 Claims, 9 Drawing Sheets

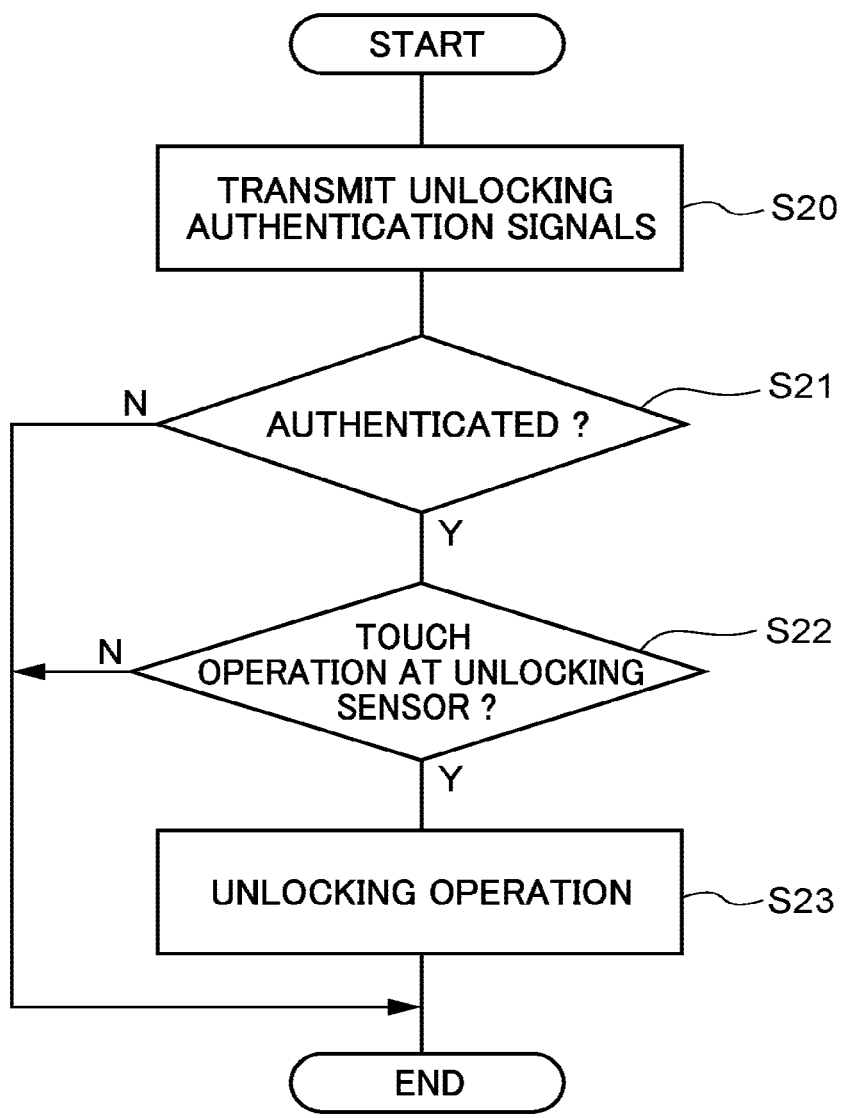

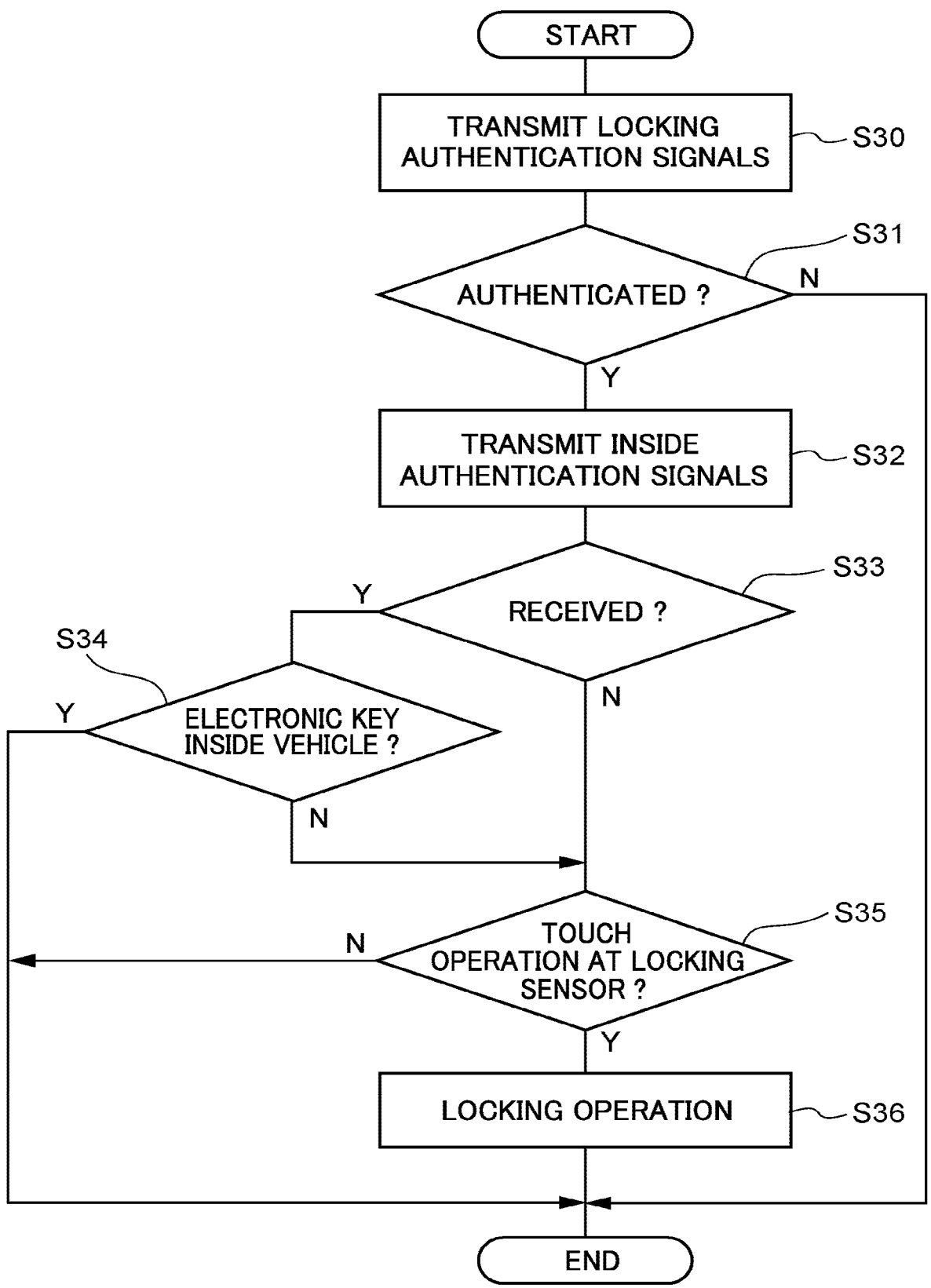

VEHICLE, VEHICLE CONTROL METHOD, AND NON-TRANSITORY RECORDING MEDIUM

CROSS-REFERENCE TO RELATED APPLICATION

This application is based on and claims priority under 35 USC 119 from Japanese Patent Application No. 2022-003863 filed on Jan. 13, 2022, the disclosure of which is incorporated by reference herein.

BACKGROUND

Technical Field

The present disclosure relates to a vehicle, a vehicle control method, and a non-transitory recording medium.

Related Art

Japanese Patent Application Laid-Open (JP-A) No. 2018-052188 discloses a parking assistance device that is capable of fine adjustments of a parking position of a vehicle. This parking assistance device utilizes wireless signals transmitted by an operation terminal to implement parking assistance control to automatically park the vehicle at a target position.

A system is supposed that allows use of an operation terminal to implement parking assistance control when, on the basis of wireless communications between the vehicle and an electronic key carried by a user, the system determines that the electronic key belongs to a legitimate user. In this system, when the user carrying the electronic key is further than a predetermined distance from the vehicle, wireless signals transmitted by the vehicle can not be received by the electronic key. As a result, parking assistance control cannot be implemented in this situation. This problem can be solved by raising a reception sensitivity of the electronic key to wireless signals.

A system is known that, when the body of a vehicle occupant touches a door of a vehicle while wireless signals are being exchanged between the vehicle and the electronic key, switches a door lock device provided at the door into an unlocked state or a locked state. The vehicle can utilize wireless signals transmitted by the vehicle to determine whether or not the electronic key is located inside the vehicle. The system can be configured to switch the door lock device into the locked state when the vehicle determines that the electronic key is not located inside the vehicle and the body of the vehicle occupant touches the door.

However, when the reception sensitivity of an electronic key is high, the electronic key is more likely to receive electronic signals transmitted by a vehicle when located outside the vehicle. When the electronic key located outside the vehicle receives the wireless signals, the vehicle can determine that the electronic key is located outside the vehicle, but it is difficult for the vehicle to conduct this determination quickly. Thus, in this situation, the door lock device may not be switched into the locked state quickly when the body of a vehicle occupant touches the door.

In consideration of the circumstances described above, an object of the present disclosure is to provide a vehicle, vehicle control method and non-transitory recording medium that can reduce incidences of issues caused by the reception sensitivity of an electronic key to wireless signals being high.

SUMMARY

A vehicle according to a first aspect of the present disclosure includes a processor, a receiver unit, a lock device and a transmission unit. The receiver unit receives confirmation signals transmitted from an electronic key that receives authentication signals transmitted from the vehicle, the authentication signals being wireless signals and the confirmation signals being wireless signals. When the receiver unit receives the confirmation signals, the processor determines whether the electronic key is located inside the vehicle or located outside the vehicle on the basis of the received confirmation signals, and when the receiver unit does not receive the confirmation signals, the processor determines that the electronic key is located outside the vehicle. When a predetermined first operation is performed at a door of the vehicle and the processor has determined that the electronic key is located outside the vehicle, the lock device puts the door into a locked state from an unlocked state. When a predetermined second operation is performed at the vehicle, the transmission unit transmits switching signals for lowering a reception sensitivity of the electronic key to wireless signals.

A vehicle control method according to a fifth aspect of the present disclosure is performed by a processor equipped at a vehicle including a receiver unit, a lock device and a transmission unit. The vehicle control method includes: causing the receiver unit to receive confirmation signals transmitted from an electronic key that receives authentication signals transmitted from the vehicle; determining whether the electronic key is located inside the vehicle or located outside the vehicle on the basis of the received confirmation signals; when a predetermined first operation is performed at a door of the vehicle and the processor has determined that the electronic key is located outside the vehicle, controlling the lock device to put the door from an unlocked state into a locked state; and when a predetermined second operation is performed at the vehicle, causing the transmission unit to transmit switching signals for lowering a reception sensitivity of the electronic key to wireless signals.

A non-transitory recording medium according to a sixth aspect of the present disclosure stores a program that is executable by a computer to execute processing including: causing a receiver unit to receive confirmation signals transmitted from an electronic key that receives authentication signals transmitted from a vehicle, the vehicle including the receiver unit, a lock device and a transmission unit; determining whether the electronic key is located inside the vehicle or located outside the vehicle on the basis of the received confirmation signals; when a predetermined first operation is performed at a door of the vehicle and the computer has determined that the electronic key is located outside the vehicle, controlling the lock device to put the door into a locked state from an unlocked state; and when a predetermined second operation is performed at the vehicle, causing the transmission unit to transmit switching signals for lowering a reception sensitivity of the electronic key to wireless signals.

By transmitting signals that cause the reception sensitivity to wireless signals of an electronic key to be lowered, the vehicle, vehicle control method and non-transitory recording medium according to the present disclosure can reduce incidences of issues caused by the reception sensitivity to electronic signals of the electronic key being high.

BRIEF DESCRIPTION OF THE DRAWINGS

Exemplary embodiments of the present disclosure will be described in detail based on the following figures, wherein:

FIG. 9 is a flowchart showing a flow of processing carried out by the on-board device.

FIG. 10 is a flowchart showing a flow of processing carried out by the on-board device.

DETAILED DESCRIPTION

Below, a vehicle 10, vehicle control method and non-transitory recording medium according to an exemplary embodiment of the present disclosure will be described.

Figure 1:
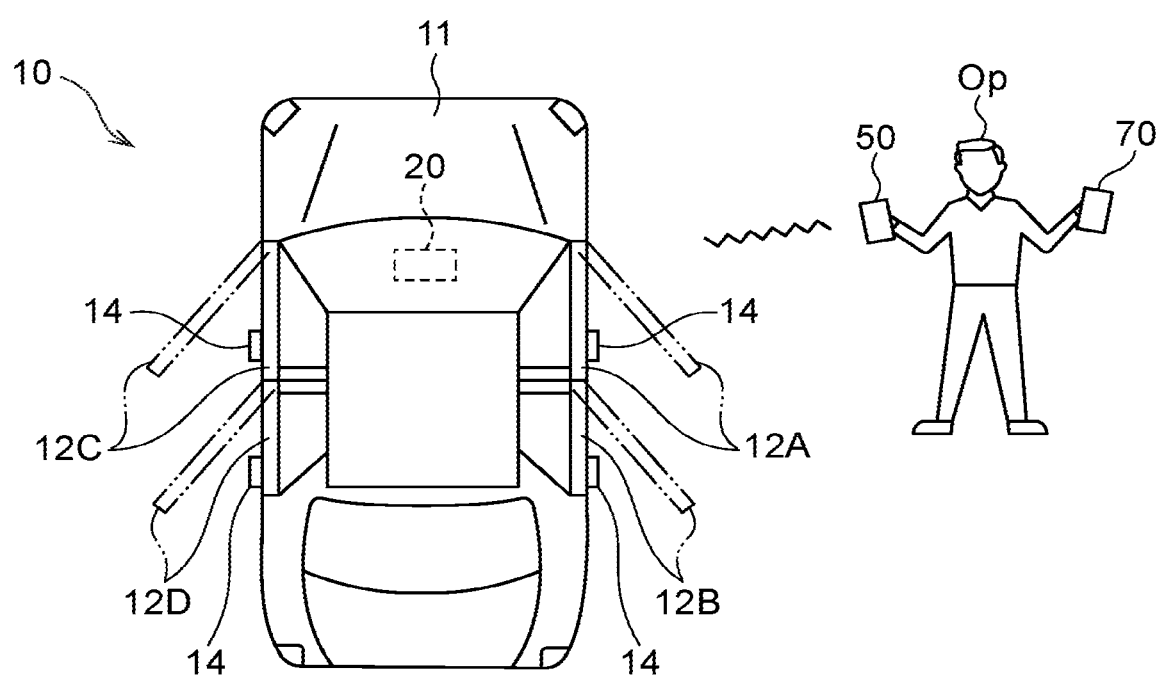
FIG. 1 is a schematic view of a vehicle, an electronic key and an operation terminal according to a present exemplary embodiment.

The vehicle 10 shown in FIG. 1 is equipped with a vehicle body 11 and four doors 12A, 12B, 12C and 12D that open and close four aperture portions formed in side faces of the vehicle body 11. The doors 12A, 12B, 12C and 12D can be turned relative to the vehicle body 11 between closed positions that close off the corresponding aperture portions (the positions shown by solid lines in FIG. 1) and open positions that open up the aperture portions (the positions shown by imaginary lines in FIG. 1). At each of the doors 12A, 12B, 12C and 12D, a door lock device (locking device) that includes an electric actuator 13 is provided. With driving force of the electric actuator 13, each door lock device is capable of switching between a locked state (a latched state) that, when the door 12A, 12B, 12C or 12D is disposed at the closed position, retains the door 12A, 12B, 12C or 12D at the closed position and an unlocked state (an unlatched state) that allows the door 12A, 12B, 12C or 12D to be turned between the closed position and the open position.

At each of the doors 12A, 12B, 12C and 12D, an outside handle 14 is provided. An unlocking sensor 15 and a locking sensor 16 are provided at each outside handle 14 (see FIG. 2). The unlocking sensor 15 and locking sensor 16 are capacitive sensors. When part of the body of an occupant Op of the vehicle 10 touches the unlocking sensor 15, the unlocking sensor 15 outputs sensing signals. Similarly, when part of the body of the occupant Op touches the locking sensor 16, the locking sensor 16 outputs sensing signals. Below, operations in which part of the body of the vehicle occupant Op touches the unlocking sensor 15 or the locking sensor 16 are referred to as "touch operations" (a first operation and a second operation). In the present specification and claims, the meaning of the term "occupant" is intended to include people on board the vehicle 10 and people performing operations in relation to the vehicle 10. For example, a person not on board the vehicle 10 who is performing an opening or closing operation of the door 12A, 12B, 12C or 12D is encompassed by the meaning of the term "occupant".

Figure 2:
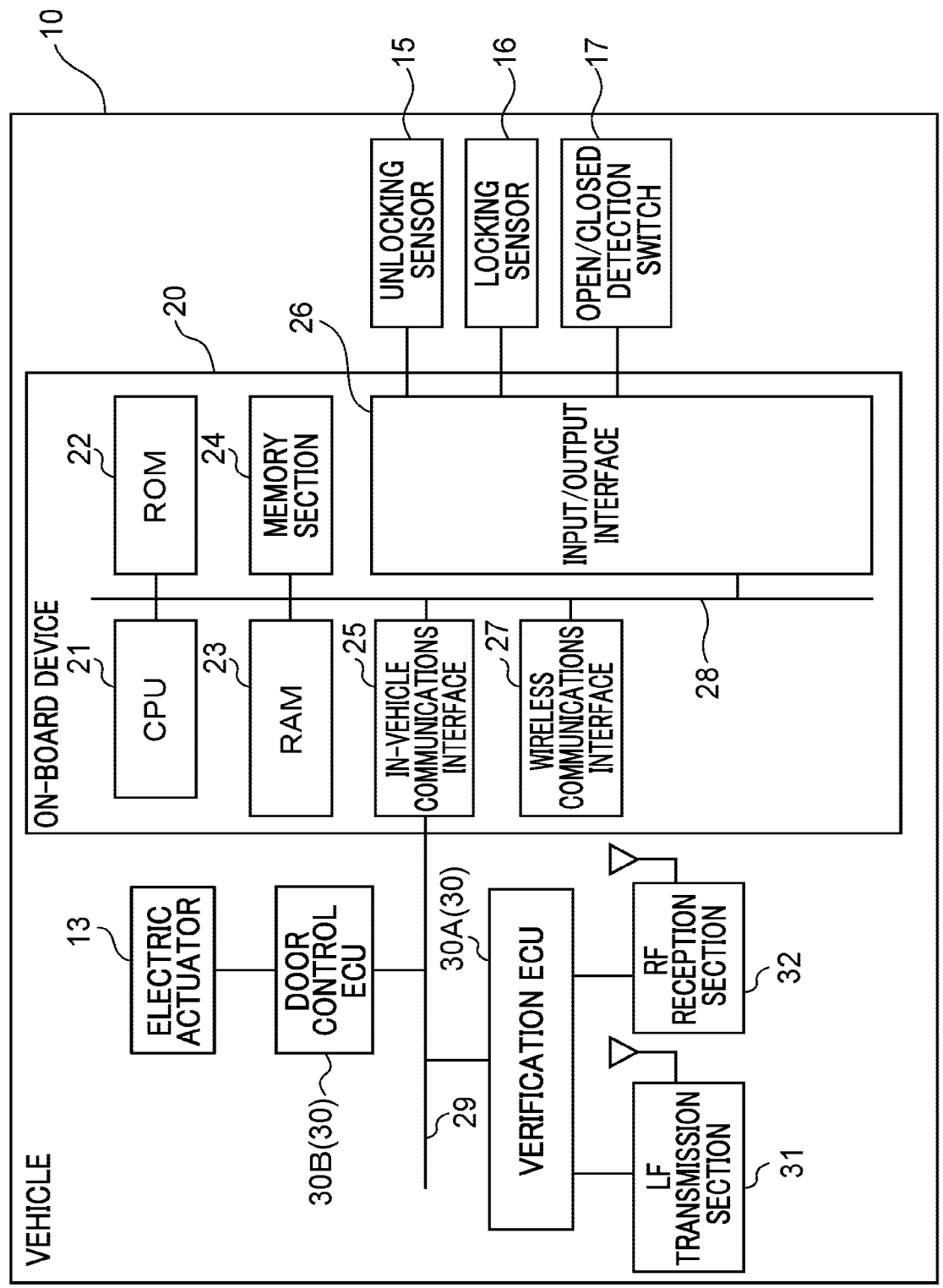
FIG. 2 is a block diagram showing hardware structures of the vehicle shown in FIG. 1.

Four open/closed detection switches 17 are provided at the vehicle body 11, which detect open and closed states of the doors 12A, 12B, 12C and 12D (see FIG. 2). Each open/closed detection switch 17 outputs open signals when the corresponding door 12A, 12B, 12C or 12D has been moved from the closed position to the open position, and the open/closed detection switch 17 outputs closed signals when the corresponding door 12A, 12B, 12C or 12D is disposed at the closed position.

Next, hardware structures of the vehicle 10 will be described with reference to FIG. 2.

As shown in FIG. 2, the vehicle 10 is equipped with an on-board device (a computer) 20, plural electronic control units (ECUs) 30, a low frequency (LF) transmission unit 31 (a transmission unit), and a radio frequency (RF) receiver unit 32 (a receiver unit).

The on-board device 20 includes a central processing unit (CPU) 21 (a processor), read-only memory (ROM) 22, random access memory (RAM) 23, a memory section 24, an in-vehicle communications interface 25, an input/output interface 26 and a wireless communications interface 27. The CPU 21, ROM 22, RAM 23, memory section 24, in-vehicle communications interface 25, input/output interface 26 and wireless communications interface 27 are connected to be capable of communications with one another via an internal bus 28.

The CPU 21 is a central arithmetic processing unit that executes various programs and controls respective parts. That is, the CPU 21 reads a program from the ROM 22 or the memory section 24, and executes the program using the RAM 23 as a workspace. The CPU 21 implements control of the structures described above and various kinds of computational processing in accordance with programs recorded in the ROM 22 or memory section 24.

The ROM 22 serves as a non-transitory recording medium and stores various programs and various kinds of data. The RAM 23 serves as a workspace, temporarily memorizing programs and data.

The memory section 24, which serves as a non-transitory recording medium, is constituted by a memory device such as a hard disk drive (HDD), solid state drive (SSD), flash memory or the like. The memory section 24 stores various programs and various kinds of data. In the present exemplary embodiment, vehicle identification (ID) information is stored in the memory section 24. The vehicle ID information is ID information that is particular to the vehicle 10.

The in-vehicle communications interface 25 is an interface for connection with the ECU 30. This interface employs, for example, a communications standard based on the CAN protocol. The in-vehicle communications interface 25 is connected to an external bus 29.

The input/output interface 26 is an interface for communicating with various devices. These devices include, for example, the unlocking sensors 15, the locking sensors 16, the open/closed detection switches 17 and, not shown in the drawings, a camera, a monitor, a speaker and a GPS device.

The wireless communications interface 27 is a communications unit that conducts wireless communications using Bluetooth (registered trademark). The wireless communications interface 27 conducts Bluetooth (registered trademark) Low Energy (BLE) communications with a communications section of an operation terminal 70, which is described below.

As shown in FIG. 2, a plural number of the ECU 30 (computers) are provided in the vehicle 10. The ECUs 30 according to the present exemplary embodiment include a verification ECU 30A and a door control ECU 30B, which are connected to the external bus 29. Each ECU 30 includes a CPU (processor), ROM that serves as a non-transitory recording medium, RAM, a memory section that serves as the non-transitory recording medium, an in-vehicle communications interface, an input/output interface and a wireless communications interface. The CPU, ROM, RAM, memory section, in-vehicle communications interface, input/output interface and wireless communications interface are connected to be capable of communications with one another via an internal bus.

The verification ECU 30A is connected to the LF transmission unit (transmitter) 31 and the RF receiver unit 32. The LF transmission unit 31 is a communications unit that conducts wireless communications in the LF band. The LF transmission unit 31 transmits LF signals, which are electromagnetic waves in the LF band, toward an LF receiver unit 65, which is described below. The LF transmission unit 31 is disposed at plural locations of the vehicle 10. The LF signals include, for example, unlocking authentication signals, locking authentication signals, inside authentication signals (authentication signals) and switching signals, which are described below.

At a time when the above-mentioned sensing signals are outputted by any of the unlocking sensors 15, the LF transmission unit 31 transmits switching signals, which are LF signals. The LF transmission unit 31 also transmits the switching signals at a time when the above-mentioned open signals are outputted by any of the open/closed detection switches 17. Durations for which the LF transmission unit 31 transmits the switching signals are very short.

The RF receiver unit 32 is a communications unit that conducts wireless communications in the RF band. The RF receiver unit 32 receives RF signals, which are electromagnetic waves in the RF band, from an RF transmission unit 66, which is described below.

Figure 4:
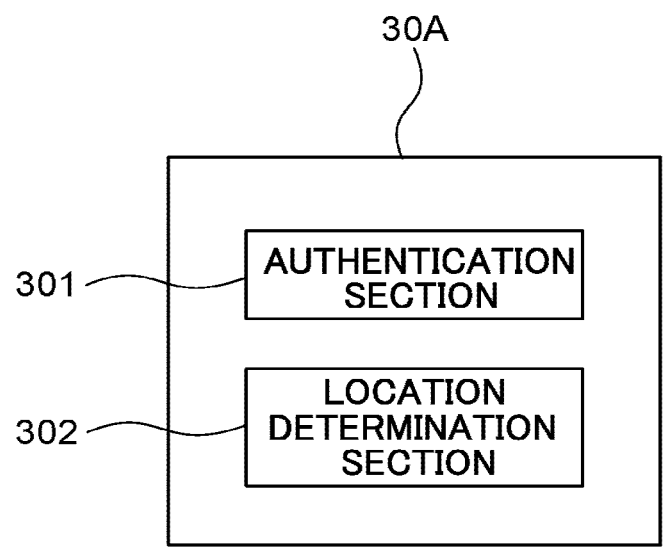
FIG. 4 is a functional block diagram of a verification ECU shown in FIG. 2.

FIG. 4 is a block diagram showing an example of functional structures of the verification ECU 30A. As functional structures, the verification ECU 30A includes an authentication section 301 and a location determination section (determination section) 302 (a determiner). The authentication section 301 and location determination section 302 are realized by the CPU of the verification ECU 30A reading and executing a control program memorized at the ROM.

As is described below, when the authentication section 301 receives unlocking confirmation signals, locking confirmation signals or inside confirmation signals (confirmation signals) from an electronic key 50, the authentication section 301 makes a determination as to whether or not to authenticate the electronic key 50.

As is described below, when the location determination section 302 receives inside confirmation signals from the electronic key 50, the location determination section 302 determines whether the electronic key 50 is located inside or outside the vehicle 10.

As shown in FIG. 2, each electric actuator 13 is connected to the door control ECU 30B (locker). As is described below, when a touch operation is performed at the unlocking sensors 15 or locking sensors 16 under predetermined conditions, the door control ECU 30B switches the door lock devices between the locked state and the unlocked state by controlling the electric actuators 13.

Next, the electronic key 50 and operation terminal 70, which are capable of wireless communications with the vehicle 10, will be described.

The electronic key 50 is carried by an occupant Op of the vehicle 10 and can remotely operate the vehicle 10 via wireless communications with the vehicle 10. For example, the electronic key 50 can switch the door lock devices of the vehicle 10 between the locked state and the unlocked state. The electronic key 50 is, for example, a smart key or a smartphone.

Figure 3:
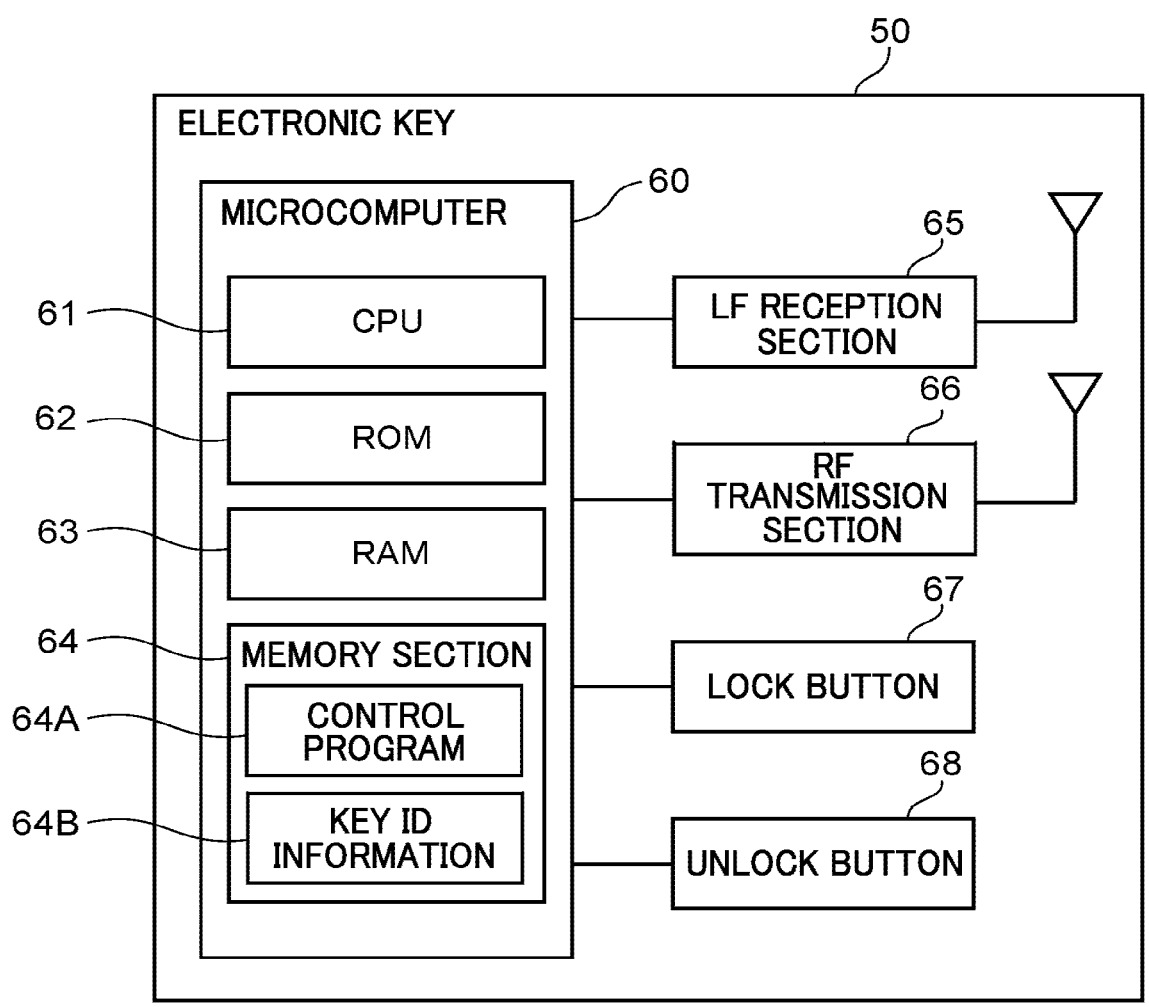
FIG. 3 is a block diagram showing hardware structures of the electronic key shown in FIG. 1.

As shown in FIG. 3, the electronic key 50 includes a microcomputer 60, the LF receiver unit 65, the RF transmission unit 66, a lock button 67 and an unlock button 68.

The microcomputer 60 includes a CPU 61, ROM 62, RAM 63 and a memory section 64. A control program 64A, for executing at least the processing that is described below, and key ID information 64B, which is information regarding an ID unique to the electronic key 50, are stored at the memory section 64.

The LF receiver unit 65 is a communications unit that implements wireless communications in the LF band. The LF receiver unit 65 receives the LF signals transmitted by the LF transmission unit 31.

The RF transmission unit 66 is a communications unit that implements wireless communications in the RF band. The RF transmission unit 66 transmits the RF signals to the RF receiver unit 32.

The lock button 67 is a button for switching the door lock devices of the doors 12A, 12B, 12C and 12D of the vehicle 10 into the locked state.

The unlock button 68 is a button for switching the door lock devices of the doors 12A, 12B, 12C and 12D of the vehicle 10 into the unlocked state.

When the lock button 67 of the electronic key 50 is operated, the RF transmission unit 66 transmits RF signals including a lock request to switch the door lock devices to the locked state. When the unlock button 68 of the electronic key 50 is operated, the RF transmission unit 66 transmits RF signals including an unlock request to switch the door lock devices to the unlocked state.

When the RF receiver unit 32 of the vehicle 10 receives the RF signals including the lock request, the door control ECU 30B receives commands from the on-board device 20 and controls the electric actuators 13 so as to put all of the door lock devices into the locked state. When the RF receiver unit 32 receives the RF signals including the unlock request, the door control ECU 30B receives commands from the on-board device 20 and controls the electric actuators 13 so as to put all of the door lock devices into the unlocked state.

When the occupant Op carrying the electronic key 50 performs a touch operation at the unlocking sensor 15 or locking sensor 16 of the door 12A, 12B, 12C or 12D under predetermined conditions, the electric actuators 13 switch the door lock devices between the locked state and the unlocked state.

That is, when the LF receiver unit 65 of the electronic key 50 that is located outside the vehicle receives unlocking authentication signals, which are LF signals transmitted by the LF transmission unit 31 of the vehicle 10, the RF transmission unit 66 of the electronic key 50 transmits unlocking confirmation signals, which are RF signals and include the key ID information 64B, to the vehicle 10. Thus, the electronic key 50 reports to the vehicle 10 that the electronic key 50 is in a range in which the unlocking authentication signals can be received. In the present exemplary embodiment, the LF transmission unit 31 transmits the unlocking authentication signals when a distance between the electronic key 50 and the vehicle 10 is equal to or less than a predetermined distance. When the RF receiver unit 32 receives the unlocking confirmation signals, the authentication section 301 of the verification ECU 30A verifies the key ID information 64B against vehicle ID information memorized at the memory section 24. If the key ID information 64B matches the vehicle ID information, the authentication section 301 authenticates the electronic key 50. Alternatively, if the key ID information 64B does not match the vehicle ID information, the authentication section 301 does not authenticate the electronic key 50. If the occupant Op performs a touch operation at any of the unlocking sensors 15 before a predetermined duration has passed after the verification ECU 30A of the vehicle 10 authenticates the electronic key 50, the door control ECU 30B receives control signals from the on-board device 20 and controls the electric actuators 13 of all of the doors 12A, 12B, 12C and 12D. As a result, the door lock devices of all of the doors 12A, 12B, 12C and 12D are put into the unlocked state.

When the LF receiver unit 65 of the electronic key 50 receives locking authentication signals, which are LF signals transmitted by the LF transmission unit 31, the RF transmission unit 66 of the electronic key 50 transmits locking confirmation signals, which are RF signals and include the key ID information 64B, to the vehicle 10. Thus, the electronic key 50 reports to the vehicle 10 that the electronic key 50 is in a range in which the locking authentication signals can be received. In the present exemplary embodiment, the LF transmission unit 31 transmits the locking authentication signals when the occupant Op performs a touch operation at the locking sensors 16. When the RF receiver unit 32 receives the locking confirmation signals, the authentication section 301 of the verification ECU 30A verifies the key ID information 64B against the vehicle ID information memorized at the memory section 24. If the key ID information 64B matches the vehicle ID information, the authentication section 301 authenticates the electronic key 50.

In accordance with the locking confirmation signals, the LF transmission unit 31 of the vehicle 10 authenticating the electronic key 50 transmits inside authentication signals, which are LF signals. The inside authentication signals can be received by the LF receiver unit 65 of the electronic key 50 that is located inside or outside the vehicle 10. As is described below, the electronic key 50 (the LF receiver unit 65) can switch a reception sensitivity to LF signals between a standard sensitivity and a high sensitivity. When the electronic key 50 is located inside the vehicle 10, the electronic key 50 can receive the inside authentication signals whichever sensitivity is specified for the reception sensitivity. On the other hand, when the electronic key 50 is located outside the vehicle 10, a range (a region) in which the electronic key 50 can receive the inside authentication signals is determined by the specified type of reception sensitivity.

The electronic key 50 receiving the inside authentication signals transmits inside confirmation signals, which are RF signals and include the key ID information 64B, to the vehicle 10. Thus, the electronic key 50 reports to the vehicle 10 that the electronic key 50 is in a range in which the inside authentication signals can be received. At this time, the electronic key 50 calculates a Received Signal Strength Indicator (RSSI), which is a magnitude of electromagnetic wave strength of the inside authentication signals received by the electronic key 50, and transmits information representing the acquired RSSI to the vehicle 10 together with the inside confirmation signals. When the electronic key 50 transmits the inside authentication signals, the authentication section 301 of the verification ECU 30A makes a determination as to whether to authenticate the electronic key 50, by the same method as described above. A situation is supposed in which the RF receiver unit 32 of the vehicle 10 transmits the inside authentication signals but the electronic key 50 does not transmit the inside confirmation signals to the vehicle 10. If the occupant Op performs a touch operation at any of the locking sensors 16 in this situation, the door control ECU 30B receives control signals from the on-board device 20 and controls the electric actuators 13 of all of the doors 12A, 12B, 12C and 12D. As a result, the door lock devices of all of the doors 12A, 12B, 12C and 12D are put into the locked states.

Next, functional structures of the electronic key 50 will be described with reference to FIG. 5.

Figure 5:
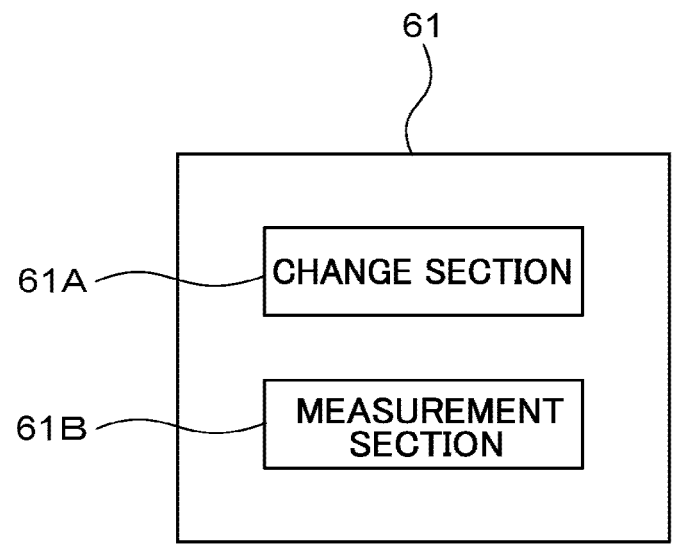
FIG. 5 is a functional block diagram of hardware structures of the electronic key shown in FIG. 1.

As shown in FIG. 5, as functional structures, the CPU 61 of the electronic key 50 includes a change section 61A and a measurement section 61B. The functional structures are realized by the CPU 61 reading and executing the control program 64A memorized at the memory section 64.

The electronic key 50 according to the present exemplary embodiment is capable of switching the reception sensitivity of LF signals transmitted from the vehicle 10. That is, the reception sensitivity of the electronic key 50 (the LF receiver unit 65) can be switched between a standard sensitivity (a first sensitivity) and a high sensitivity (a second sensitivity) that is a higher reception sensitivity than the standard sensitivity. When the reception sensitivity of the electronic key 50 is the high sensitivity, the electronic key 50 can receive LF signals of a predetermined strength transmitted from the vehicle 10 at locations further from the vehicle 10 than if the reception sensitivity was the standard sensitivity. The change section 61A includes a function for switching the reception sensitivity of the electronic key 50 between the standard sensitivity and the high sensitivity. If the unlock button 68 is operated when the reception sensitivity to LF signals is the standard sensitivity, the change section 61A changes the reception sensitivity to the high sensitivity. The LF receiver unit 65 includes an amplifier for changing the reception sensitivity. The change section 61A changes the reception sensitivity of the electronic key 50 from the standard sensitivity to the high sensitivity by increasing a current amount flowing in the amplifier.

When a predetermined duration has passed after the reception sensitivity to LF signals is changed to the high sensitivity, the change section 61A changes the reception sensitivity to the standard sensitivity. This predetermined duration is, for example, one minute. The change section 61A also changes the reception sensitivity to the standard sensitivity if the lock button 67 is operated while the reception sensitivity to LF signals is the high sensitivity. That is, the change section 61A changes the reception sensitivity of the electronic key 50 from the high sensitivity to the standard sensitivity by reducing the current amount flowing in the amplifier.

When the electronic key 50 (the LF receiver unit 65) at which the reception sensitivity has been set to the high sensitivity receives switching signals transmitted by the LF transmission unit 31 of the vehicle 10, the change section 61A switches the reception sensitivity of the electronic key 50 to the standard sensitivity.

Figure 6:
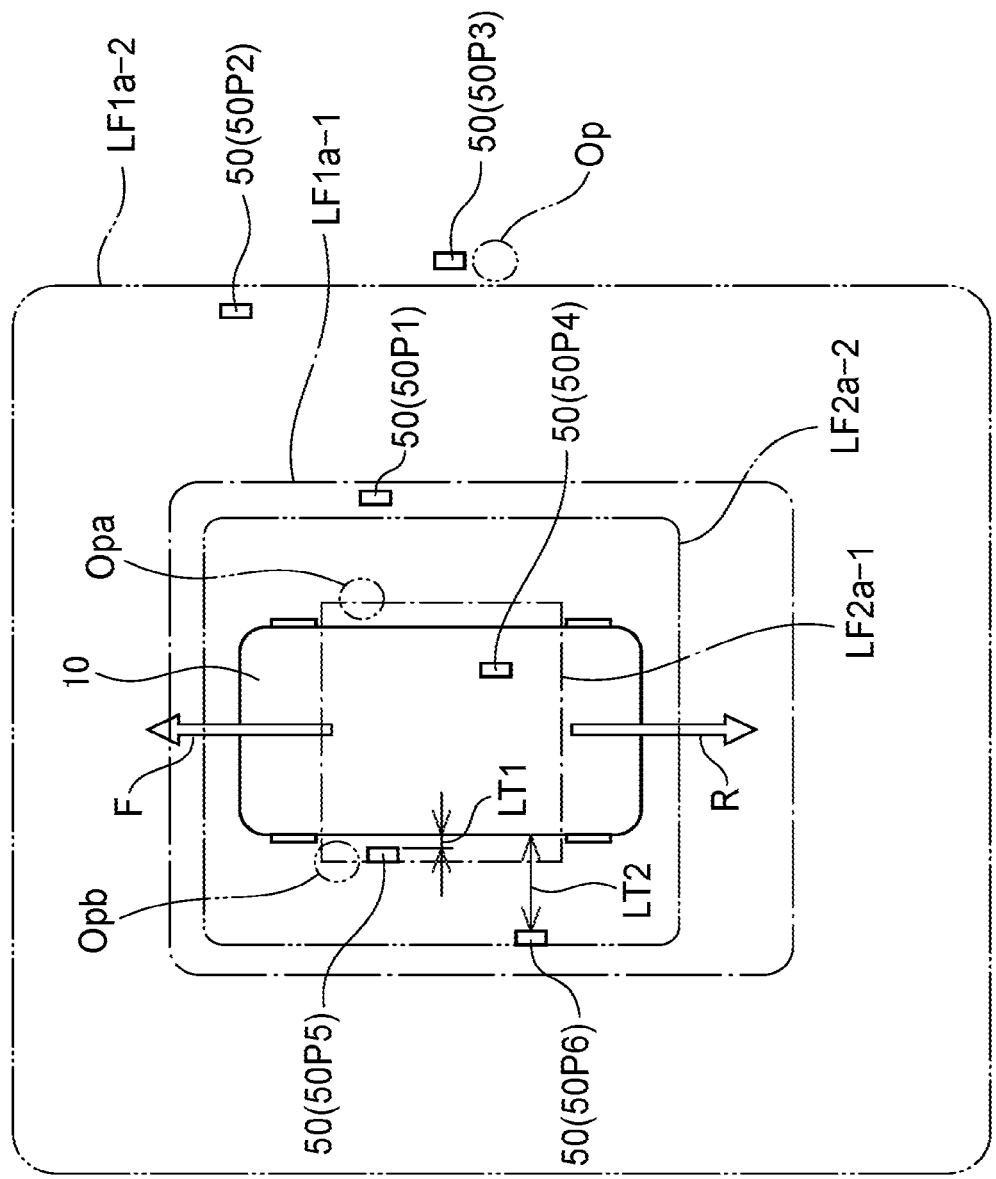
FIG. 6 is a schematic plan view of the vehicle, electronic key and operation terminal according to the present exemplary embodiment.

FIG. 6 schematically depicts ranges in which the electronic key 50 can receive LF signals. A standard reception range LF1a-1 shown in FIG. 6 represents a range in which the electronic key 50 (the LF receiver unit 65) can receive first LF signals when the reception sensitivity is the standard sensitivity. An extended reception range LF1a-2 represents a range in which the electronic key 50 (the LF receiver unit 65) can receive the first LF signals when the reception sensitivity is the high sensitivity. The unlocking authentication signals, locking authentication signals and switching signals are included in the first LF signals. The reference symbol 50P1 shown in FIG. 6 depicts a location that is inside the standard reception range LF1a-1 but outside the vehicle 10. The reference symbol 50P2 depicts a location that is outside the standard reception range LF1a-1 but inside the extended reception range LF1a-2. When the reception sensitivity of the electronic key 50 is the standard sensitivity, the electronic key 50 can receive the first LF signals when located at 50P1. When the reception sensitivity of the electronic key 50 is the standard sensitivity, the electronic key 50 cannot receive the first LF signals when located at 50P2. When the reception sensitivity of the electronic key 50 is the high sensitivity, the electronic key 50 located at 50P2 can receive the first LF signals. When the reception sensitivity of the electronic key 50 is the high sensitivity, the electronic key 50 cannot receive the first LF signals when located at 50P3.

A standard reception range LF2a-1 shown in FIG. 6 represents a range in which the electronic key 50 (the LF receiver unit 65) whose reception sensitivity is the standard sensitivity can receive second LF signals. An extended reception range LF2a-2 represents a range in which the electronic key 50 (the LF receiver unit 65) whose reception sensitivity is the high sensitivity can receive the second LF signals. The inside authentication signals are included in the second LF signals.

The reference symbol 50P4 shown in FIG. 6 depicts a predetermined location inside the vehicle 10, and the reference symbol SOPS depicts a predetermined location outside the vehicle 10. The location 50P4 and the location SOPS are included in the standard reception range LF2a-1. Therefore, when the reception sensitivity of the electronic key 50 is the standard sensitivity, the electronic key 50 that is located at location 50P4 or location 50P5 can receive the second LF signals. The reference symbol 50P6 shown in FIG. 6 depicts a location that is inside the extended reception range LF2a-2 but outside the standard reception range LF2a-1. Therefore, when the reception sensitivity of the electronic key 50 is the standard sensitivity, the electronic key 50 can not receive the second LF signals when located at the location 50P6. The distance between the vehicle 10 and location 50P5 is represented by a first distance LT1, and the distance between the vehicle 10 and location 50P6 is represented by a second distance LT2. As is clear in FIG. 6, the first distance LT1 is less than the second distance LT2.

When the reception sensitivity of the electronic key 50 is the high sensitivity, the electronic key 50 located at location SOPS or location 50P6 can receive the second LF signals.

The measurement section 61B includes a timer that measures a duration passing after the reception sensitivity is set to the high sensitivity. Each time the measurement section 61B is to measure the passing duration, the measurement section 61B resets the timer and starts measurement.

The operation terminal 70 carried by the occupant Op encompasses, for example, laptop personal computers, smartphones and tablet terminals.

The operation terminal 70 is equipped with a CPU, ROM, RAM, memory section, entry section, display section and communications section. These structures are connected to be capable of communicating with one another via a bus. Functions of the CPU, ROM, RAM and memory section of the operation terminal 70 are similar to, respectively, the CPU 61, ROM 62, RAM 63 and memory section 64 of the electronic key 50. The entry section of the operation terminal 70 includes, for example, buttons, a microphone and a camera. The display section of the operation terminal 70 is a liquid crystal display. The display section is a touch panel at which various kinds of information can be entered. That is, the display section also functions as the entry section. The communications section of the operation terminal 70 is capable of implementing wireless communications with the wireless communications interface 27 of the vehicle 10 using Bluetooth (registered trademark).

Next, a vehicle control method according to the present exemplary embodiment will be described with reference to the flowcharts in FIG. 7 to FIG. 10.

Figure 7:
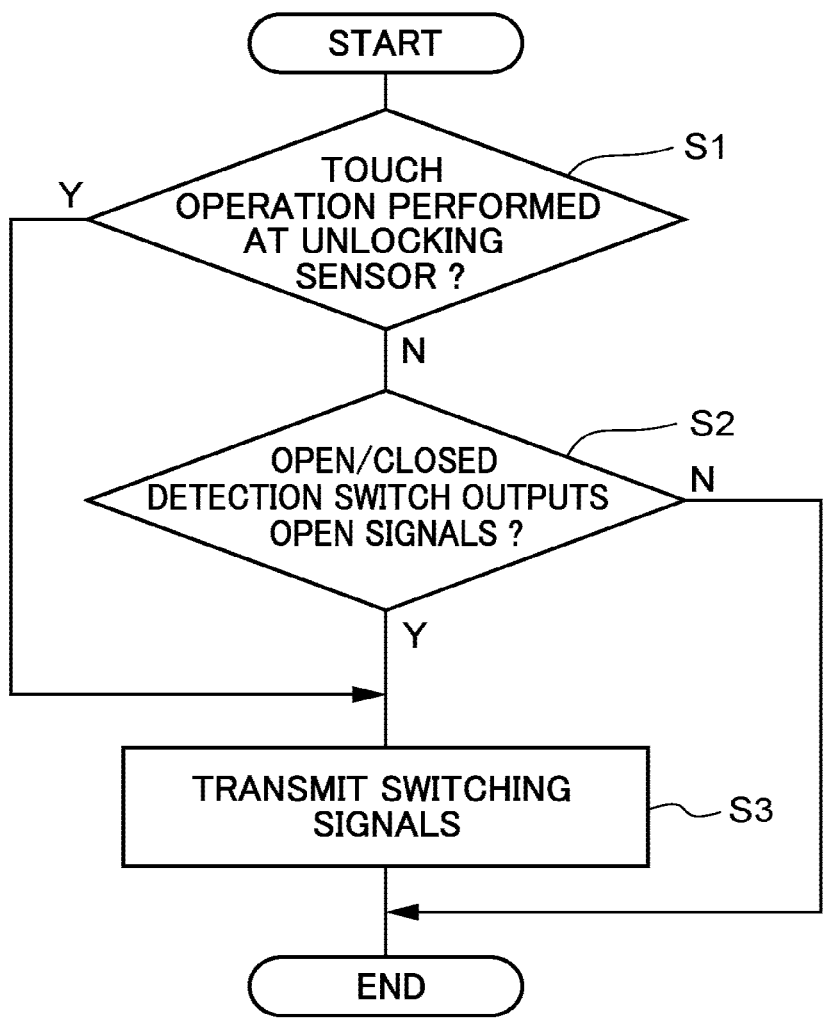
FIG. 7 is a flowchart showing a flow of processing carried out by an on-board device of the vehicle shown in FIG. 1.

FIG. 7 is a flowchart showing processing that is executed by the CPU of the verification ECU 30A. The CPU of the verification ECU 30A repeatedly executes the processing of the flowchart in FIG. 7, each time a predetermined duration passes.

In step S1, the CPU makes a determination as to whether a touch operation at the unlocking sensors 15 has been performed. That is, the CPU makes a determination as to whether any of the unlocking sensors 15 has outputted the sensing signals. When the result of the determination in step S1 is "no", the CPU proceeds to step S2 and makes a determination as to whether any of the open/closed detection switches 17 has outputted the open signals.

When the result of the determination in step S1 or step S2 is "yes", the CPU proceeds to step S3 and causes the LF transmission unit 31 to output the switching signals.

When the result of the determination in step S2 is "no" or the processing of step S3 is completed, the CPU temporarily ends the processing of the flowchart in FIG. 7.

Figure 8:
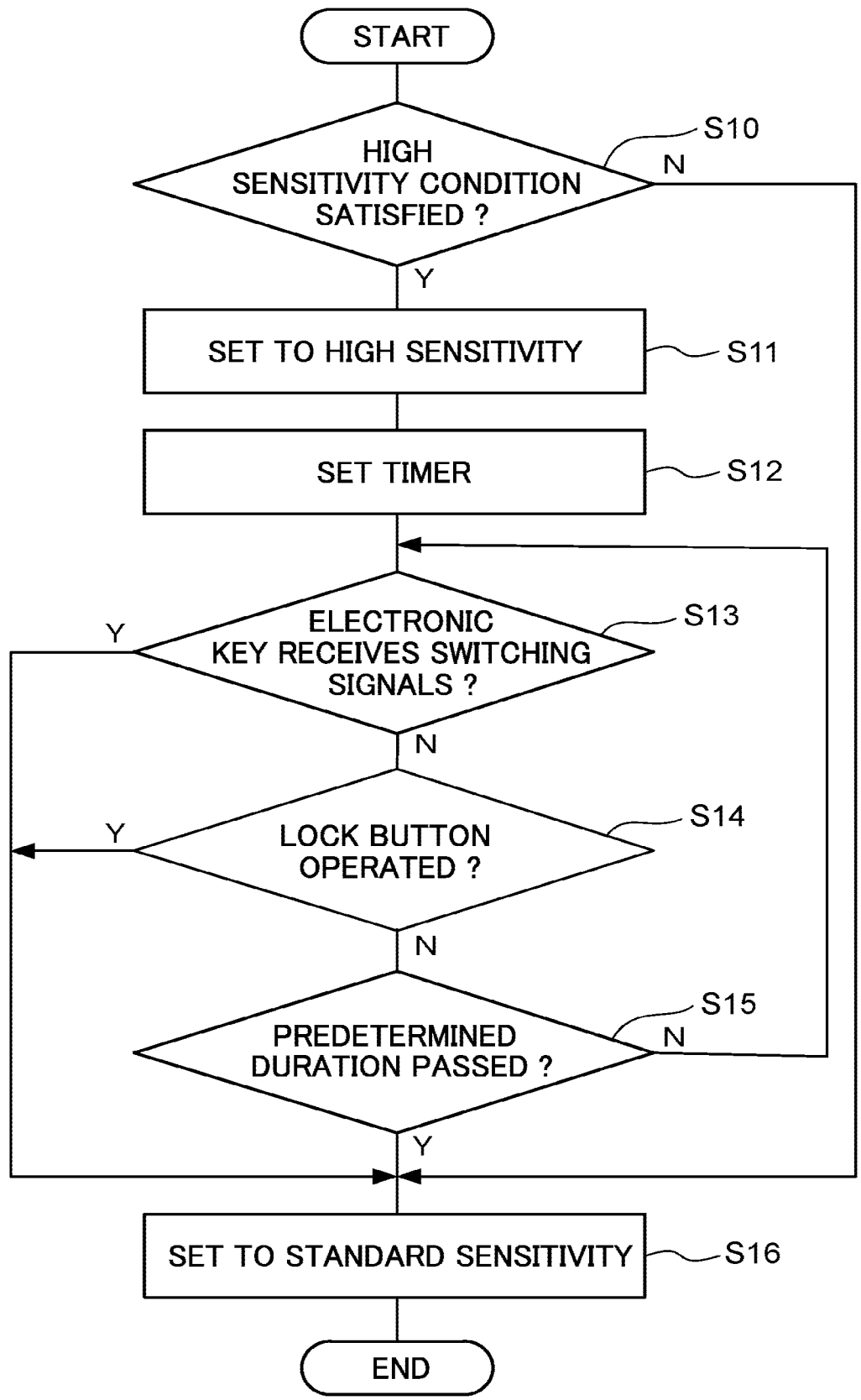
FIG. 8 is a flowchart showing a flow of processing carried out by the electronic key according to the present exemplary embodiment.

FIG. 8 is a flowchart showing processing to set the reception sensitivity of the electronic key 50. The CPU 61 reads the control program 64A from the memory section 64, loads the control program 64A into the RAM 63 and executes the control program 64A. Thus, this processing is repeatedly executed, each time a predetermined duration passes. It is assumed that the reception sensitivity of the electronic key 50 is set to the standard sensitivity at a time when this processing begins.

In step S10, the CPU 61 makes a determination as to whether a high sensitivity condition is satisfied. When the CPU 61 determines that the high sensitivity condition is satisfied ("yes" in step S10), the CPU 61 proceeds to step S11. On the other hand, when the CPU 61 determines that the high sensitivity condition is not satisfied, ("no" in step S10), the CPU 61 proceeds to step S16. The CPU 61 determines that the high sensitivity condition is satisfied when an occupant Op of the vehicle 10 operates the unlock button 68 of the electronic key 50.

In step S11, the CPU 61 sets the reception sensitivity of the electronic key 50 to the high sensitivity. Then the CPU 61 proceeds to step S12.

In step S12 the CPU 61 performs a timer setting. That is, the CPU 61 resets the timer and then starts to measure the duration passing after the reception sensitivity is set to the high sensitivity.

In step S13, the CPU 61 makes a determination as to whether the electronic key 50 (the LF receiver unit 65) has received switching signals transmitted by the vehicle 10 (the LF transmission unit 31). When the CPU 61 determines that the electronic key 50 has received the switching signals ("yes" in step S13), the CPU 61 proceeds to step S16. On the other hand, when the result of the determination in step S13 is "no", the CPU 61 proceeds to step S14 and makes a determination as to whether the lock button 67 of the electronic key 50 has been operated. When the CPU 61 determines that the lock button 67 has been operated ("yes" in step S14), the CPU 61 proceeds to step S16.

When the CPU 61 determines that the lock button 67 has not been operated ("no" in step S14), the CPU 61 proceeds to step S15. In step S15, the CPU 61 makes a determination as to whether the predetermined duration has passed since the start of measurement by the timer in step S12. When the CPU 61 determines that the predetermined duration has passed ("yes" in step S15), the CPU 61 proceeds to step S16. On the other hand, when the CPU 61 determines that the predetermined duration has not passed ("no" in step S15), the CPU 61 returns to step S13.

When the result of a determination in step S13, S14 or S15 is "yes", the CPU 61 proceeds to step S16 and sets the reception sensitivity of the electronic key 50 to the standard sensitivity. Then, the CPU 61 temporarily ends the processing of the flowchart in FIG. 8.

Next, processing to put the door lock devices of the vehicle 10 into the unlocked state in response to an occupant Op who is carrying the electronic key 50 performing a touch operation at the unlocking sensors 15 of the vehicle 10 will be described with reference to the flowchart in FIG. 9. The CPU of the verification ECU 30A repeatedly executes the processing of the flowchart in FIG. 9, each time a predetermined duration passes.

In step S20, the CPU of the verification ECU 30A of the vehicle 10 causes the LF transmission unit 31 to transmit the unlocking authentication signals.

In step S21, the CPU of the verification ECU 30A makes a determination as to whether the unlocking confirmation signals have been received from the electronic key 50. When the unlocking confirmation signals have been received, the authentication section 301 of the verification ECU 30A uses the key ID information 64B included in the unlocking confirmation signals and the vehicle ID information to make a determination as to whether to authenticate the electronic key 50. When the electronic key 50 is authenticated, the CPU proceeds to step S22.

In step S22, the CPU of the verification ECU 30A makes a determination as to whether the occupant Op performs a touch operation at the unlocking sensors 15 before a predetermined duration passes after the authentication of the electronic key 50. When the touch operation is performed, the CPU proceeds to step S23.

In step S23, the CPU of the verification ECU 30A controls all of the electric actuators 13. As a result, the door lock devices of all of the doors 12A, 12B, 12C and 12D are switched to the unlocked state. Then, the CPU 61 temporarily ends the processing of the flowchart in FIG. 9.

Next, processing to put the door lock devices of the vehicle 10 into the locked state in response to the occupant Op who is carrying the electronic key 50 performing a touch operation at the locking sensors 16 of the vehicle 10 will be described with reference to the flowchart in FIG. 10. The CPU of the verification ECU 30A repeatedly executes the processing of the flowchart in FIG. 10, each time a predetermined duration passes.

In step S30, the CPU of the verification ECU 30A of the vehicle 10 causes the LF transmission unit 31 to transmit the locking authentication signals.

In step S31, the CPU of the verification ECU 30A makes a determination as to whether the locking confirmation signals have been received from the electronic key 50. When the locking confirmation signals have been received, the authentication section 301 of the verification ECU 30A uses the key ID information 64B included in the locking confirmation signals and the vehicle ID information to make a determination as to whether to authenticate the electronic key 50. When the electronic key 50 is authenticated, the CPU proceeds to step S32.

In step S32, the CPU of the verification ECU 30A of the vehicle 10 causes the LF transmission unit 31 to transmit the inside authentication signals.

In step S33, the CPU of the verification ECU 30A makes a determination as to whether the inside confirmation signals have been received from the electronic key 50. When the inside confirmation signals have been received, the CPU proceeds to step S34.

In step S34, on the basis of information representing an RSSI that is included in the inside confirmation signals received from the electronic key 50, the CPU of the verification ECU 30A makes a determination as to whether the electronic key 50 is located inside or outside the vehicle 10. That is, when the RSSI is greater than a predetermined threshold, the CPU determines that the electronic key 50 is located inside the vehicle 10, and when the RSSI is less than or equal to the predetermined threshold, the CPU determines that the electronic key 50 is located outside the vehicle 10. For example, when the electronic key 50 whose reception sensitivity is the standard sensitivity is located at location 50P5 of FIG. 6, the CPU determines that the electronic key 50 is located outside the vehicle 10. Alternatively, when the electronic key 50 whose reception sensitivity is the high sensitivity is located at location 50P6 of FIG. 6, the CPU determines that the electronic key 50 is located outside the vehicle 10. Thus, when the electronic key 50 is located outside the vehicle 10 and receives the inside authentication signals, the CPU of the verification ECU 30A determines that the electronic key 50 is located outside the vehicle 10. Below, this determination is referred to as a "first determination". When the electronic key 50 that is located outside the vehicle 10 receives the inside authentication signals and transmits the inside confirmation signals, a maximum duration required for the CPU to make the first determination after the inside authentication signals are transmitted is defined as a "first duration". When the CPU determines that the electronic key 50 is located outside the vehicle 10, the CPU proceeds to step S35.

When the result of the determination in step S33 is "no", the CPU of the verification ECU 30A determines that the electronic key 50 is located outside the vehicle 10. Below, this determination is referred to as a "second determination". In this situation, a maximum duration required for the CPU to make the second determination after the inside authentication signals are transmitted is defined as a "second duration".

In step S35, the CPU of the verification ECU 30A makes a determination as to whether the occupant Op performs a touch operation at the locking sensors 16 before a predetermined duration passes from the time when the result of the determination in step S33 is "no" or the result of the determination in step S34 is "no". When the touch operation is performed, the CPU proceeds to step S36.

In step S36, the CPU of the verification ECU 30A controls all of the electric actuators 13. As a result, the door lock devices of all of the doors 12A, 12B, 12C and 12D are switched to the locked state. Then, the CPU 61 temporarily ends the processing of the flowchart in FIG. 10.

Next, remote operation of the vehicle 10 by the operation terminal 70 will be described. This remote operation may be implemented in the above-mentioned predetermined duration after the vehicle 10 authenticates the electronic key 50. The vehicle 10 that is subject to this remote operation utilizes a power source and braking equipment of the vehicle 10 to implement at least one of advancing (see arrow F in FIG. 6) and reversing (see arrow R in FIG. 6).

A situation is supposed in which, before remote operation is conducted using the operation terminal 70, the door lock devices of all of the doors 12A, 12B, 12C and 12D of the vehicle 10 have been set to the unlocked state by the occupant Op operating the unlock button 68 of the electronic key 50. In this situation, the reception sensitivity of the electronic key 50 is set to the high sensitivity, and the electronic key 50 that is located at location 50P2 in FIG. 6 can receive the first LF signals (unlocking authentication signals or locking authentication signals) transmitted by the vehicle 10. Therefore, after the vehicle 10 has authenticated the electronic key 50, the occupant Op located at location 50P2 can utilize the operation terminal 70 to cause the vehicle 10 to advance by remote operation. In accordance with the vehicle 10 advancing in response to operation of the operation terminal 70, the on-board device 20 of the vehicle 10 controls the electric actuators 13 so as to put the door lock devices of all of the doors 12A, 12B, 12C and 12D into the locked state.

After the vehicle 10 stops at a predetermined position, when the occupant Op operates the unlock button 68, the door lock devices of the doors 12A, 12B, 12C and 12D of the vehicle 10 are put into the unlocked state.

As described above, the CPU of the verification ECU 30A according to the present exemplary embodiment makes the first determination when the electronic key 50 is located outside the vehicle 10 and receives the inside authentication signals. The CPU of the verification ECU 30A makes the second determination when the electronic key 50 is located outside the vehicle 10 and does not receive the inside authentication signals. The CPU makes the first determination when the distance between the electronic key 50 located outside the vehicle 10 and the vehicle 10 is small. When the distance between the electronic key 50 located outside the vehicle 10 and the vehicle 10 is small, the RSSI is at a value close to the aforementioned threshold. Therefore, the CPU can not easily determine whether the electronic key 50 is inside or outside the vehicle 10. Accordingly, the first duration, which is the duration required for the first determination, is likely to be longer than the second duration.

When the reception sensitivity of the electronic key 50 located outside the vehicle 10 is set to the standard sensitivity and the distance from the vehicle 10 is not more than the first distance LT1, the electronic key 50 can receive the second LF signals (the inside authentication signals). That is, when the distance from the vehicle 10 to the electronic key 50 is greater than the first distance LT1, the electronic key 50 cannot receive the second LF signals. Alternatively, when the reception sensitivity of the electronic key 50 located outside the vehicle 10 is set to the high sensitivity and the distance from the vehicle 10 is not more than the second distance LT2, the electronic key 50 can receive the second LF signals (the inside authentication signals). Thus, when the reception sensitivity of the electronic key 50 located outside the vehicle 10 is set to the standard sensitivity, the electronic key 50 is harder to receive the second LF signals (the inside authentication signals) than when the reception sensitivity is set to the high sensitivity. Therefore, when the reception sensitivity of the electronic key 50 is set to the standard sensitivity, a likelihood of the on-board device 20 making the first determination is lower than when the reception sensitivity is set to the high sensitivity. Consequently, when the reception sensitivity of the electronic key 50 located outside the vehicle 10 is set to the standard sensitivity, there is a high likelihood of the on-board device 20 switching the door lock devices to the locked state at an earlier time than if the reception sensitivity was set to the high sensitivity.

In the present exemplary embodiment, when the occupant Op performs a touch operation at the unlocking sensors 15 within the predetermined duration after the electronic key 50 is authenticated by the vehicle 10, the door lock devices are switched to the unlocked state. Alternatively, when the occupant Op performs a touch operation at the locking sensors 16 within the predetermined duration after the electronic key 50 is authenticated by the vehicle 10, the door lock devices are switched to the locked state. Therefore, the occupant Op can switch the door lock devices to the unlocked state and the locked state by simple operations.

In the present exemplary embodiment, when a touch operation is performed at the outside handles 14, the LF transmission unit 31 of the vehicle 10 transmits the switching signals. Touching the outside handles 14 is an action that an occupant Op is highly likely to perform frequently. Therefore, there is a high likelihood of the reception sensitivity of the electronic key 50 being switched to the standard sensitivity due to the electronic key 50 whose reception sensitivity has been set to the high sensitivity receiving the switching signals.

When the door 12A, 12B, 12C or 12D at the closed position is moved to the open position, the LF transmission unit 31 of the vehicle 10 transmits the switching signals. This opening operation of the door 12A, 12B, 12C or 12D is an action that an occupant Op is highly likely to perform frequently. Therefore, there is a high likelihood of the reception sensitivity of the electronic key 50 being switched to the standard sensitivity due to the electronic key 50 whose reception sensitivity has been set to the high sensitivity receiving the switching signals.

A situation is supposed in which the occupant Op at location 50P3 in FIG. 6 is carrying the electronic key 50 whose reception sensitivity is the high sensitivity and another occupant Opa performs a touch operation at the unlocking sensor 15 provided at one of the outside handles 14 (not shown in FIG. 6). In this situation, the electronic key 50 cannot receive the switching signals transmitted by the LF transmission unit 31 and the reception sensitivity of the electronic key 50 remains at the high sensitivity. Hence, a situation is supposed in which the occupant Op carrying the electronic key 50 moves to location 50P1 and still another occupant Opb (not shown in FIG. 6) performs an opening operation of one of the doors 12A, 12B, 12C and 12D. In this situation, the electronic key 50 receives the switching signals transmitted by the LF transmission unit 31 and the reception sensitivity of the electronic key 50 is switched from the high sensitivity to the standard sensitivity. In the present exemplary embodiment, the LF transmission unit 31 of the vehicle 10 transmits the switching signals when a touch operation at the outside handles 14 is performed and when the door 12A, 12B, 12C or 12D at the closed position is moved to the open position. Therefore, the vehicle 10 according to the present exemplary embodiment is more likely to switch the reception sensitivity of the electronic key 50 to the standard sensitivity than a configuration of the vehicle 10 in which the LF transmission unit 31 transmits the switching signals either when a touch operation at the outside handles 14 is performed or when the door 12A, 12B, 12C or 12D at the closed position is moved to the open position.

The duration for which the LF transmission unit 31 transmits the switching signals is extremely short. Therefore, there is little risk of the transmitted switching signals affecting other wireless signals that are being transmitted and received inside the vehicle 10 and in the vicinity of the vehicle 10.

The vehicle 10, vehicle control method and non-transitory recording medium according to the present exemplary embodiment are described above. However, the vehicle 10, vehicle control method and non-transitory recording medium can be suitably modified within a technical scope not departing from the gist of the present disclosure.

For example, the electronic key 50 located outside the vehicle 10 can be made unable to receive the inside authentication signals by the standard sensitivity being set to a small magnitude. When the reception sensitivity of this electronic key 50 is set to the standard sensitivity and the electronic key 50 is located outside the vehicle, the on-board device 20 makes the second determination within the second duration after the inside authentication signals are transmitted. Therefore, when the reception sensitivity of the electronic key 50 is set to the standard sensitivity, the on-board device 20 does not make the first determination. Consequently, when the reception sensitivity of this electronic key 50 is set to the standard sensitivity, there is a high likelihood of the on-board device 20 switching the door lock devices to the locked state at an earlier time than if the reception sensitivity was set to the high sensitivity.

The electronic key 50 may, for example, emit a sound when the reception sensitivity of the electronic key 50 is switched. In this case, a sound when switching to the high sensitivity may be different from a sound when switching to the standard sensitivity.

The CPU of the verification ECU 30A may cause the electric actuators 13 to switch the door lock devices to the unlocked state only when a touch operation is performed at the unlocking sensors 15 at a time when the electronic key 50 has been authenticated.

When the CPU of the verification ECU 30A authenticates the electronic key 50 and a touch operation is performed at one of the unlocking sensors 15, the door lock device of only the door 12A, 12B, 12C or 12D at which that unlocking sensor 15 is provided may be switched to the unlocked state.

The CPU of the verification ECU 30A may cause the electric actuators 13 to switch the door lock devices to the locked state only when a touch operation is performed at the locking sensors 16 at a time when the result of the determination in step S33 is "no" or a time when the result of the determination in step S34 is "no".

An unlocking button may be provided at each outside handle 14 instead of the unlocking sensor 15, and a locking button may be provided at each outside handle 14 instead of the locking sensor 16. In this case, the door lock device is switched to the unlocked state when the unlocking button is pressed, and the door lock device is switched to the locked state when the locking button is pressed.

The vehicle 10 may be configured to be switchable between a first mode, in which locking and unlocking operations of the door lock devices can be implemented using the electronic key 50, and a second mode, in which the same operations cannot be implemented using the electronic key 50. The processing of the flowchart in FIG. 7 may be executed only when the vehicle 10 is in the first mode. In this configuration, the LF transmission unit 31 does not transmit the switching signals when the vehicle 10 is in the second mode.

The RF transmission unit 66 of the electronic key 50 receiving the switching signals may transmit RF signals that are reception confirmation signals. After the LF transmission unit 31 transmits the switching signals, the LF transmission unit 31 may repeatedly transmit the switching signals a predetermined number of times until the RF receiver unit 32 receives the reception confirmation signals.

The processing that, in the exemplary embodiment described above, is executed by CPUs reading software (programs) may be executed by various kinds of processor other than a CPU. Processors in these cases include a PLD (programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The processing described above may be executed by one of these various kinds of processors, and may be executed by a combination of two or more processors of the same or different kinds. Hardware structures of these various kinds of processors are electronic circuits combining circuit components such as semiconductor components and the like.

In the exemplary embodiment described above, the control program 64A is installed in advance at the memory section 64, but the control program 64A may be provided in a mode recorded on a recording medium, such as a CD-ROM (compact disc read-only memory), DVD-ROM (digital versatile disc read-only memory), USB (universal serial bus) memory or the like. The control program 64A may also be downloaded to the vehicle 10 (the on-board device 20) from external equipment via a network.

What is claimed is:

1. A vehicle, comprising:
    a receiver unit that receives confirmation signals transmitted from an electronic key that receives authentication signals transmitted from the vehicle, the authentication signals being wireless signals and the confirmation signals being wireless signals;
    a processor that, when the receiver unit receives the confirmation signals, determines whether the electronic key is located inside the vehicle or located outside the vehicle on the basis of the received confirmation signals, and when the receiver unit does not receive the confirmation signals, determines that the electronic key is located outside the vehicle;
    a lock device that, when an operation is performed on an outside handle of a door of the vehicle and the processor has determined that the electronic key is located outside the vehicle, puts the door into a locked state from an unlocked state; and
    a transmission unit that, when an opening operation is performed at the door of the vehicle or a touch operation is performed on the outside handle, transmits switching signals for lowering a reception sensitivity of the electronic key to wireless signals,
    wherein, when the receiver unit receives a signal which puts the door into the unlocked state from the electronic key, the transmission unit transmits signals raising a reception sensitivity of the electronic key to wireless signals.

2. A vehicle control method performed by a processor provided at a vehicle including a receiver unit, a lock device and a transmission unit, the vehicle control method comprising:

causing the receiver unit to receive confirmation signals transmitted from an electronic key that receives authentication signals transmitted from the vehicle;

determining whether the electronic key is located inside the vehicle or located outside the vehicle on the basis of the received confirmation signals;

when an operation is performed on an outside handle of a door of the vehicle and the processor has determined that the electronic key is located outside the vehicle, controlling the lock device to put the door into a locked state from an unlocked state;

when an opening operation is performed at the door of the vehicle or a touch operation is performed on the outside handle, causing the transmission unit to transmit switching signals for lowering a reception sensitivity of the electronic key to wireless signals; and when the receiver unit receives a signal which puts the door into the unlocked state from the electronic key, transmitting signals raising a reception sensitivity of the electronic key to wireless signals.

3. A non-transitory recording medium storing a program that is executable by a computer to execute a process comprising:

causing a receiver unit to receive confirmation signals transmitted from an electronic key that receives authentication signals transmitted from a vehicle, the vehicle including the receiver unit, a lock device and a transmission unit;

determining whether the electronic key is located inside the vehicle or located outside the vehicle on the basis of the received confirmation signals;

when an operation is performed on an outside handle of a door of the vehicle and the computer has determined that the electronic key is located outside the vehicle, controlling the lock device to put the door into a locked state from an unlocked state;

when an opening operation is performed at the door of the vehicle or a touch operation is performed on the outside handle, causing the transmission unit to transmit switching signals for lowering a reception sensitivity of the electronic key to wireless signals; and when the receiver unit receives a signal which puts the door into the unlocked state from the electronic key, transmitting signals raising a reception sensitivity of the electronic key to wireless signals.

\* \* \* \* \*